United States Patent
Gutman et al.

(10) Patent No.: US 12,219,499 B2
(45) Date of Patent: Feb. 4, 2025

(54) DEMODULATION REFERENCE SIGNALING WITH VARYING TRANSMIT POWER

(71) Applicant: QUALCOMM Incorporated, San Diego, CA (US)

(72) Inventors: Igor Gutman, Hod HaSharon (IL); Tao Luo, San Diego, CA (US); Joseph Patrick Burke, San Diego, CA (US); Pushkar Bajirao Kulkarni, San Diego, CA (US); Abdelrahman Mohamed Ahmed Mohamed Ibrahim, San Diego, CA (US); Juergen Cezanne, Ocean Township, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 378 days.

(21) Appl. No.: 17/648,491

(22) Filed: Jan. 20, 2022

(65) Prior Publication Data
US 2023/0232342 A1    Jul. 20, 2023

(51) Int. Cl.
  *H04W 52/36* (2009.01)
  *H04L 5/00* (2006.01)
  *H04W 52/14* (2009.01)
  *H04W 52/24* (2009.01)
  *H04W 52/32* (2009.01)

(52) U.S. Cl.
  CPC ......... *H04W 52/367* (2013.01); *H04L 5/0051* (2013.01); *H04W 52/146* (2013.01); *H04W 52/241* (2013.01); *H04W 52/325* (2013.01)

(58) Field of Classification Search
  CPC ............ H04W 52/367; H04W 52/146; H04W 52/241; H04W 52/325; H04W 52/42; H04L 5/0051; H04L 5/0094
  See application file for complete search history.

(56) References Cited

U.S. PATENT DOCUMENTS

| | | | |
|---|---|---|---|
| 11,489,700 B2 | 11/2022 | Zach et al. | |
| 11,784,768 B2 * | 10/2023 | Go | H04L 5/0048 370/329 |
| 11,943,726 B2 * | 3/2024 | Liu | H04L 5/00 |
| 11,956,762 B2 * | 4/2024 | Nammi | H04L 5/0091 |
| 2010/0075706 A1 | 3/2010 | Montojo et al. | |
| 2018/0083744 A1 | 3/2018 | Kim et al. | |
| 2019/0190552 A1 | 6/2019 | Sagi et al. | |
| 2023/0130813 A1* | 4/2023 | Horiuchi | H04B 7/086 375/260 |

(Continued)

FOREIGN PATENT DOCUMENTS

EP    2608410 A1    6/2013

*Primary Examiner* — Julio R Perez
(74) *Attorney, Agent, or Firm* — Harrity & Harrity LLP /Qualcomm Incorporated

(57) ABSTRACT

Various aspects of the present disclosure generally relate to wireless communication. In some aspects, a user equipment (UE) may receive a configuration of a first resource within a slot and a second resource within the slot. The UE may receive a demodulation reference signal (DMRS) based at least in part on the first resource, wherein the DMRS is associated with a first transmit power. The UE may receive an additional DMRS based at least in part on the second resource, wherein the additional DMRS is associated with a second transmit power different from the first transmit power. Numerous other aspects are described.

30 Claims, 9 Drawing Sheets

(56) References Cited

U.S. PATENT DOCUMENTS

| | | | |
|---|---|---|---|
| 2023/0216711 A1* | 7/2023 | Yao | H04L 5/0051 370/328 |
| 2023/0224127 A1* | 7/2023 | Xie | H04L 5/0051 370/329 |
| 2023/0239109 A1* | 7/2023 | Gao | H04L 5/0094 370/329 |
| 2023/0318776 A1* | 10/2023 | Liu | H04L 5/0051 375/267 |
| 2023/0318879 A1* | 10/2023 | Mukherjee | H04L 5/0051 370/329 |
| 2023/0344677 A1* | 10/2023 | Ye | H04L 25/0204 |
| 2023/0354206 A1* | 11/2023 | Li | H04W 52/146 |
| 2024/0080156 A1* | 3/2024 | Gao | H04L 5/0035 |

* cited by examiner

DEMODULATION REFERENCE SIGNALING WITH VARYING TRANSMIT POWER

FIELD OF THE DISCLOSURE

Aspects of the present disclosure generally relate to wireless communication and to techniques and apparatuses for a demodulation reference signaling with varying transmit power.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a configuration of a first resource within a slot and a second resource within the slot. The method may include receiving a demodulation reference signal (DMRS) based at least in part on the first resource, wherein the DMRS is associated with a first transmit power. The method may include receiving an additional DMRS based at least in part on the second resource, wherein the additional DMRS is associated with a second transmit power different from the first transmit power.

Some aspects described herein relate to a method of wireless communication performed by a base station. The method may include transmitting a configuration of a first resource within a slot and a second resource within the slot. The method may include transmitting a DMRS based at least in part on the first resource, wherein the DMRS is transmitted using a first transmit power. The method may include transmitting an additional DMRS based at least in part on the second resource, wherein the additional DMRS is transmitted using a second transmit power different from the first transmit power.

Some aspects described herein relate to an apparatus for wireless communication at a UE. The apparatus may include a memory and one or more processors coupled to the memory. The one or more processors may be configured to receive a configuration of a first resource within a slot and a second resource within the slot. The one or more processors may be configured to receive a DMRS based at least in part on the first resource, wherein the DMRS is associated with a first transmit power. The one or more processors may be configured to receive an additional DMRS based at least in part on the second resource, wherein the additional DMRS is associated with a second transmit power different from the first transmit power.

Some aspects described herein relate to an apparatus for wireless communication at a base station. The apparatus may include a memory and one or more processors coupled to the memory. The one or more processors may be configured to transmit a configuration of a first resource within a slot and a second resource within the slot. The one or more processors may be configured to transmit a DMRS based at least in part on the first resource, wherein the DMRS is transmitted using a first transmit power. The one or more processors may be configured to transmit an additional DMRS based at least in part on the second resource, wherein the additional DMRS is transmitted using a second transmit power different from the first transmit power.

Some aspects described herein relate to a non-transitory computer-readable medium that stores a set of instructions for wireless communication by a UE. The set of instructions, when executed by one or more processors of the UE, may cause the UE to receive a configuration of a first resource within a slot and a second resource within the slot. The set of instructions, when executed by one or more processors of the UE, may cause the UE to receive a DMRS based at least in part on the first resource, wherein the DMRS is associated with a first transmit power. The set of instructions, when executed by one or more processors of the UE, may cause the UE to receive an additional DMRS based at least in part on the second resource, wherein the additional DMRS is associated with a second transmit power different from the first transmit power.

Some aspects described herein relate to a non-transitory computer-readable medium that stores a set of instructions for wireless communication by a base station. The set of instructions, when executed by one or more processors of the base station, may cause the base station to transmit a configuration of a first resource within a slot and a second resource within the slot. The set of instructions, when executed by one or more processors of the base station, may cause the base station to transmit a DMRS based at least in part on the first resource, wherein the DMRS is transmitted using a first transmit power. The set of instructions, when executed by one or more processors of the base station, may cause the base station to transmit an additional DMRS based at least in part on the second resource, wherein the additional DMRS is transmitted using a second transmit power different from the first transmit power.

Some aspects described herein relate to an apparatus for wireless communication. The apparatus may include means for receiving a configuration of a first resource within a slot and a second resource within the slot. The apparatus may include means for receiving a DMRS based at least in part on the first resource, wherein the DMRS is associated with a first transmit power. The apparatus may include means for receiving an additional DMRS based at least in part on the second resource, wherein the additional DMRS is associated with a second transmit power different from the first transmit power.

Some aspects described herein relate to an apparatus for wireless communication. The apparatus may include means for transmitting a configuration of a first resource within a slot and a second resource within the slot. The apparatus may include means for transmitting a DMRS based at least in part on the first resource, wherein the DMRS is transmitted using a first transmit power. The apparatus may include means for transmitting an additional DMRS based at least in part on the second resource, wherein the additional DMRS is transmitted using a second transmit power different from the first transmit power.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
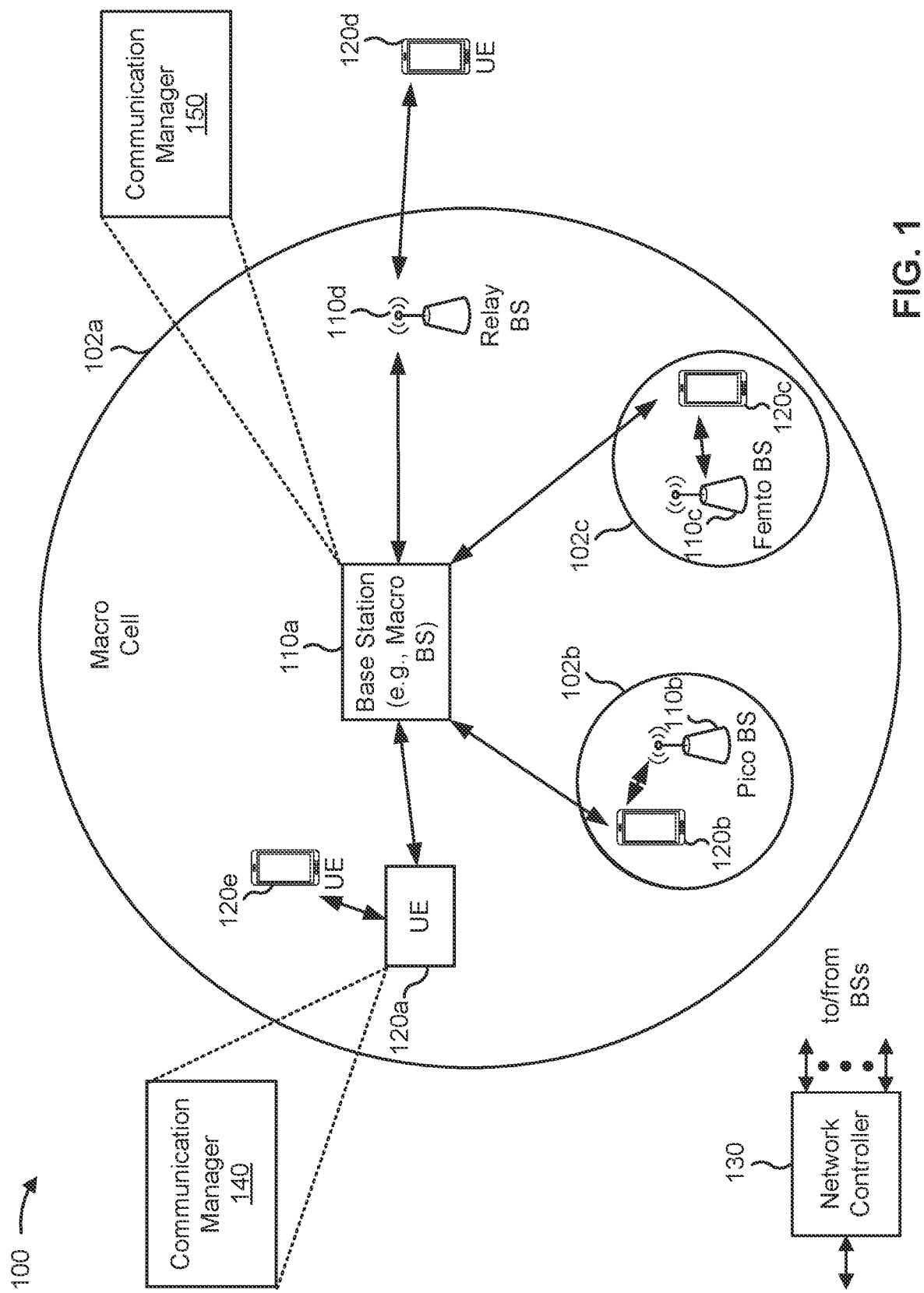
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a configuration of a first resource within a slot and a second resource within the slot; receive a demodulation reference signal (DMRS) based at least in part on the first resource, wherein the DMRS is associated with a first transmit power; and receive an additional DMRS based at least in part on the second resource, wherein the additional DMRS is associated with a second transmit power different from the first transmit power. Additionally, or alternatively, the communication manager 140 may perform one or more other operations described herein.

In some aspects, the base station 110 may include a communication manager 150. As described in more detail elsewhere herein, the communication manager 150 may transmit a configuration of a first resource within a slot and a second resource within the slot; and transmit a DMRS based at least in part on the first resource, wherein the DMRS is transmitted using a first transmit power; and transmit an additional DMRS based at least in part on the second resource, wherein the additional DMRS is transmitted using a second transmit power different from the first transmit power. Additionally, or alternatively, the communication manager 150 may perform one or more other operations described herein.

As indicated above, FIG. 1 is provided as an example. Other examples may differ from what is described with regard to FIG. 1.

Figure 2:
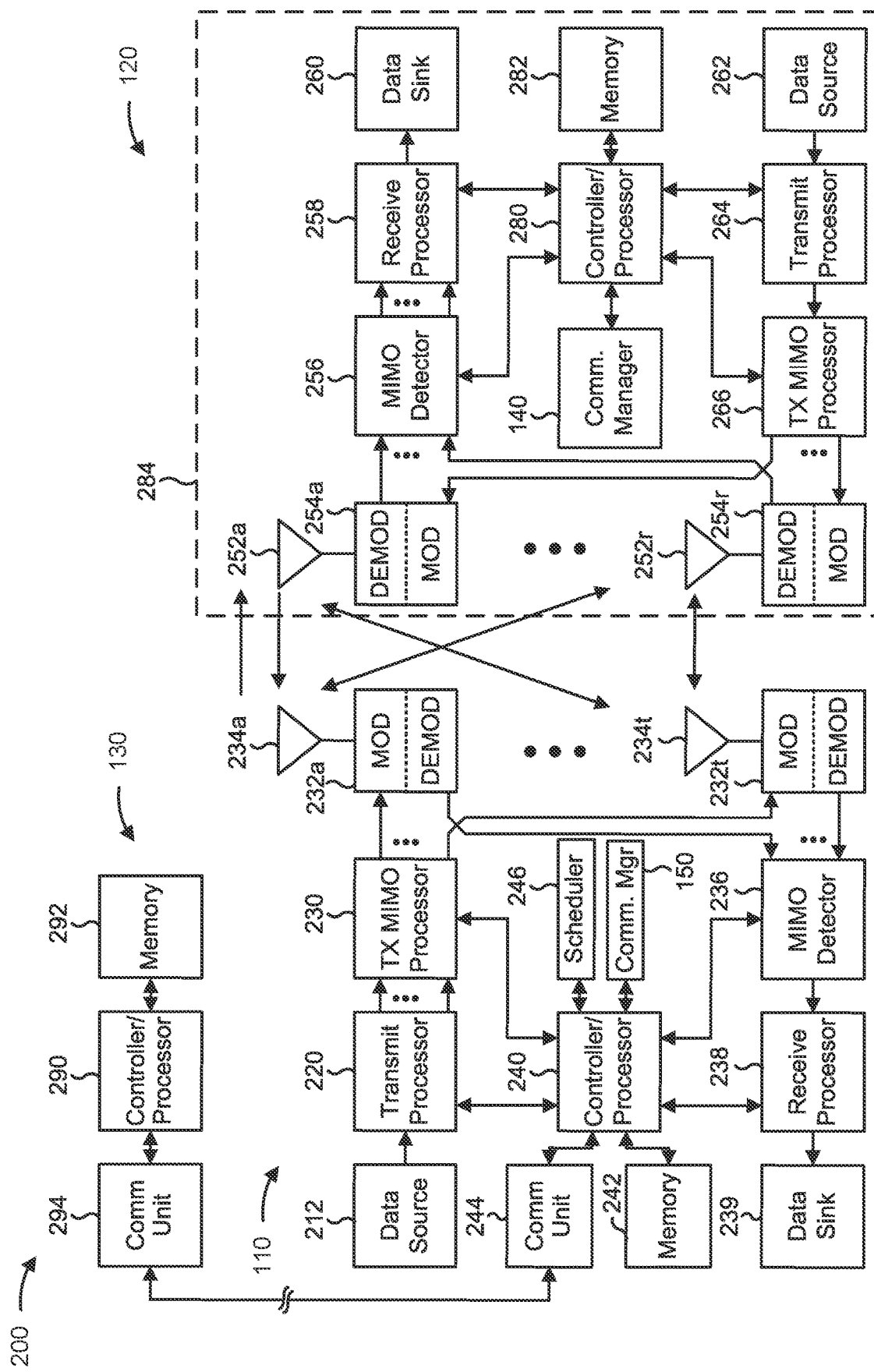
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

Although for ease of description the base station 110 is described as a single network entity, aspects of the disclosure are not so limited. In some other aspects, the base station 110 or another network entity may be disaggregated according to an open radio access network (RAN) (O-RAN) architecture or similar architecture. The O-RAN architecture may include a control unit (CU) that communicates with a core network via a backhaul link. Furthermore, the CU may communicate with one or more distributed units (DUs) via respective midhaul links. The DUs may each communicate with one or more radio units (RUs) via respective fronthaul links, and the RUs may each communicate with respective UEs 120 via radio frequency (RF) access links. The DUs and the RUs may also be referred to as O-RAN DUs (O-DUs) and O-RAN RUs (O-RUs), respectively.

In some aspects, the DUs and the RUs may be implemented according to a functional split architecture in which functionality of a base station 110 (e.g., an eNB or a gNB) is provided by a DU and one or more RUs that communicate over a fronthaul link. Accordingly, as described herein, a base station 110 may include a DU and one or more RUs that may be co-located or geographically distributed. In some aspects, the DU and the associated RU(s) may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface.

Accordingly, the DU may correspond to a logical unit that includes one or more base station functions to control the operation of one or more RUs. For example, in some aspects, the DU may host a radio link control (RLC) layer, a medium access control (MAC) layer, and one or more high physical (PHY) layers (e.g., forward error correction (FEC) encoding and decoding, scrambling, and/or modulation and demodulation) based at least in part on a lower layer functional split. Higher layer control functions, such as a packet data convergence protocol (PDCP), radio resource control (RRC), and/or service data adaptation protocol (SDAP), may be hosted by the CU. The RU(s) controlled by a DU may correspond to logical nodes that host RF processing functions and low-PHY layer functions (e.g., fast Fourier transform (FFT), inverse FFT (iFFT), digital beamforming, and/or physical random access channel (PRACH) extraction and filtering) based at least in part on the lower layer functional split. Accordingly, in an O-RAN architecture, the RU(s) handle all over the air (OTA) communication with a UE 120, and real-time and non-real-time aspects of control and user plane communication with the RU(s) are controlled by the corresponding DU, which enables the DU(s) and the CU to be implemented in a cloud-based RAN architecture.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-9).

The controller/processor 240 of the base station 110, the controller/processor 280 of the UE 120, and/or any other component(s) of FIG. 2 may perform one or more techniques associated with demodulation reference signaling with varying transmit power, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, the UE 120 includes means for receiving a configuration of a first resource within a slot and a second resource within the slot (e.g., using antenna 252, modem 254, MIMO detector 256, receive processor 258, controller/processor 280, memory 282, or the like); means for receiving a DMRS based at least in part on the first resource (e.g., using antenna 252, modem 254, MIMO detector 256, receive processor 258, controller/processor 280, memory 282, or the like), wherein the DMRS is associated with a first transmit power; and/or means for receiving an additional DMRS based at least in part on the second resource (e.g., using antenna 252, modem 254, MIMO detector 256, receive processor 258, controller/processor 280, memory 282, or the like), wherein the additional DMRS is associated with a second transmit power different from the first transmit power. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for transmitting a configuration of a first resource within a slot and a second resource within the slot (e.g., using controller/processor 240, transmit processor 220, TX MIMO processor 230, modem 232, antenna 234, memory 242, or the like); and/or means for transmitting a DMRS based at least in part on the first resource (e.g., using controller/processor 240, transmit processor 220, TX MIMO processor 230, modem 232, antenna 234, memory 242, or the like), wherein the DMRS is transmitted using a first transmit power; and/or means for transmitting an additional DMRS based at least in part on the second resource (e.g., using controller/processor 240, transmit processor 220, TX MIMO processor 230, modem 232, antenna 234, memory 242, or the like), wherein the additional DMRS is transmitted using a second transmit power different from the first transmit power. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
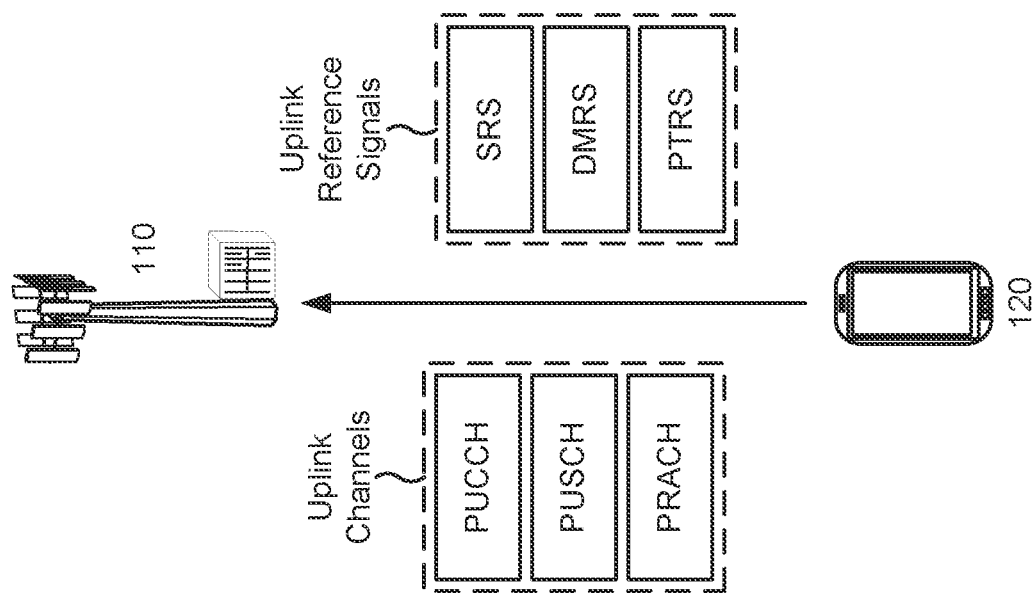
FIG. 3 is a diagram illustrating an example of physical channels and reference signals in a wireless network, in accordance with the present disclosure.
Figure 3:
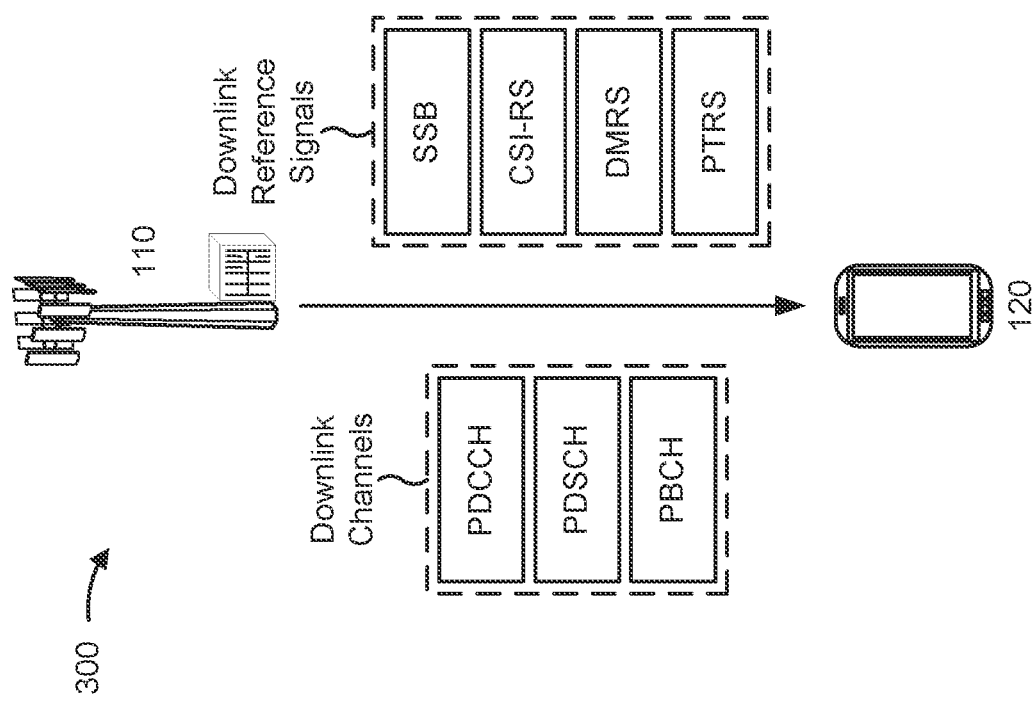

FIG. 3 is a diagram illustrating an example 300 of physical channels and reference signals in a wireless network, in accordance with the present disclosure. As shown in FIG. 3, downlink channels and downlink reference signals may carry information from a base station 110 to a UE 120, and uplink channels and uplink reference signals may carry information from a UE 120 to a base station 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a demodulation reference signal (DMRS), a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a channel quality indicator (CQI), a precoding matrix indicator (PMI), a CSI-RS resource indicator (CRI), a layer indicator (LI), a rank indicator (RI), or a reference signal received power (RSRP), among other examples. The base station 110 may use the CSI report to select transmission parameters for downlink communications to the UE 120, such as a number of transmission layers (e.g., a rank), a precoding matrix (e.g., a precoder), a modulation and coding scheme (MCS), or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the base station 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the base station 110 may then calculate a position of the UE 120 based on the RSTD measurements reported by the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

In some aspects, one or more of the reference signals described above may be used for nonlinear or linear channel estimation. For example, in some aspects, a DMRS in a slot may be used for one type of channel estimation model (e.g., for nonlinear channel estimation), while an additional DMRS in the slot may be used for a different type of channel estimation model (e.g., for linear channel estimation). This may be more readily understood with reference to FIG. 4, below.

As indicated above, FIG. 3 is provided as an example. Other examples may differ from what is described with regard to FIG. 3.

Figure 4:
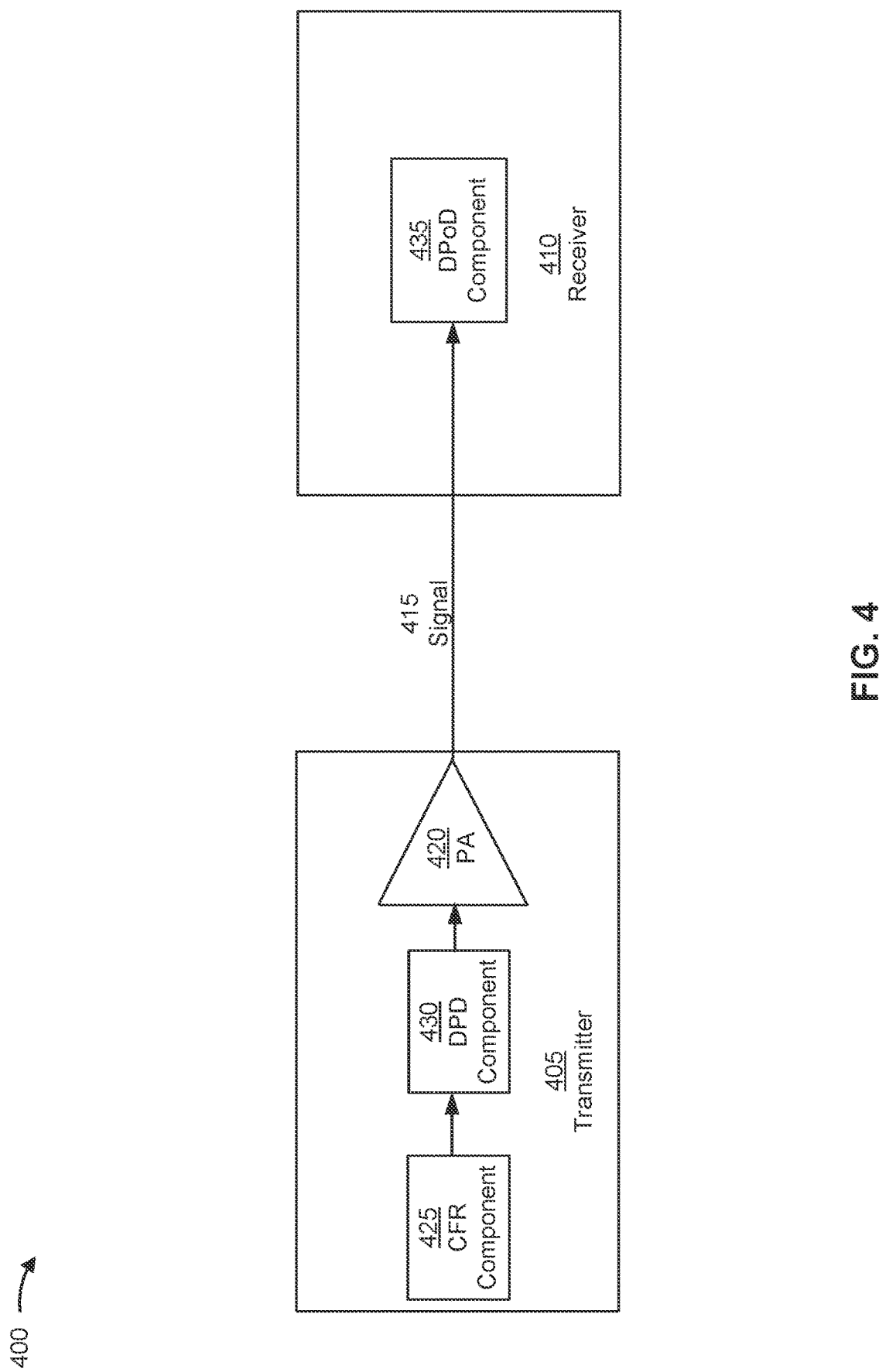
FIG. 4 is a diagram illustrating an example of a digital post distortion (DPoD) receiver, in accordance with the present disclosure.

FIG. 4 is a diagram illustrating an example 400 of a DPoD receiver, in accordance with the present disclosure. As shown in FIG. 4, a transmitter 405 may be in communication with a receiver 410. Although in some aspects described below the transmitter 405 is included in a base station 110 and the receiver 410 is included in a UE 120, the disclosure is not so limited, and, in some other aspects, the transmitter 405 may be included in the UE 120 or in another network device and/or the receiver 410 may be included in the base station 110 or another network device.

As shown, a transmitter 405 may communicate with a receiver 410, and, more particularly, the transmitter 405 may send a signal 415 to the receiver 410. The signal 415 may be pre-processed by the transmitter 405 to, among other benefits, reduce a power-back off value associated with transmission of the signal 415 to the receiver 410.

More particularly, in some communications systems, the transmitter 405 may, as power increases, transmit signals with increasing nonlinearity. For example, the transmitter 405 may include a power amplifier (PA) 420 (which, in some aspects, may be a high-power amplifier) with a limited dynamic range that may distort a transmitted signal as a result of a relatively high peak to average power ratio (PAPR). The nonlinear distortion may be an in-band distortion, which affects link performance in connection with mutual information and/or an error vector magnitude (EVM) amount, or an out-band distortion, which causes adjacent channel interference (ACI) and/or results in a high adjacent channel leakage ratio (ACLR) (e.g., the transmitted signal interferes with other signals on neighboring frequency bands, with the ACI and/or ACLR indicating how much the adjacent channel is polluted by a main transmission). To avoid nonlinearity distortions and accompanying interference, the transmitter 405 may apply a power back-off value to reduce transmit power, thereby reducing nonlinearity.

However, applying a power back-off value may result in reduced power efficiency (e.g., less available transmit power is used to transmit in a channel, thereby reducing range, signal to interference noise ratio, and/or the like). Put another way, less power from the transmitter 405 is transmitted to the channel, with more power dissipated as heat, resulting in reduced power efficiency. Accordingly, the transmitter 405 may use one or more pre-transmission signal processing techniques to reduce the power back-off value. For example, the transmitter may utilize crest factor reduction (CFR) processing and/or digital pre-distortion (DPD) processing. CFR processing may reduce the dynamic range of the signal, while DPD processing may reduce nonlinear distortion to less than a threshold level with a reduced level of power back-off, thereby increasing power efficiency relative to avoiding nonlinear distortion using only a power back-off. As shown in FIG. 4, the transmitter 405 may thus include a CFR component 425 for performing CFR processing to the signal 415 (e.g., to reduce PAPR in the signal 415 as much as possible and thus reduce the power back-off value), and/or the transmitter 405 may include a DPD component 430 for performing DPD processing to the signal 415 (e.g., to linearize the power amplifier's response).

However, CFR processing consumes additional resources (e.g., bandwidth resources, power resources, computational resources, or the like), and, in some cases, CFR processing may introduce in-band distortion (e.g., EVM distortion) and/or out-band distortion (e.g., ACI distortion). Moreover, although DPD processing may correct an in-dynamic-range nonlinearity effect, nonlinearity may still cause a clipping effect (e.g., resulting from the limited dynamic range). Thus, the effectiveness and/or power efficiency benefit of CFR processing and DPD processing are limited.

To account for limitations of CFR and/or DPD processing, the receiver 410 may apply DPoD processing to the signal 415. DPoD processing may be similar to DPD processing but is performed in the receiver 410 rather than in the transmitter 405, and may be directed to processing for only EVM instead of processing for both EVM and ACI. More particularly, DPoD processing may be performed by a DPoD component 435 at the receiver 410, which may include hardware and/or software configured to implement an algorithm configured to remove nonlinear noise that is generated by a known model (e.g., PA clipping). DPoD processing thus may allow for reduced power back-out values and greater power efficiency.

However, in order to implement DPoD processing, the receiver 410 and/or DPoD component 435 may need to estimate the nonlinear noise in the received signal 415. In some cases, the transmitter 405 may measure and/or estimate the nonlinear noise and signal the measurement to the receiver 410. This may have certain drawbacks, however, because signaling the nonlinear noise to the receiver 410 requires signaling overhead and may be inaccurate as the nonlinearity of the transmitter 405 may change with transmission power, temperature, beam steering, or the like.

Thus, in some cases, the receiver 410 may estimate the nonlinear noise using a reference signal, such as by using a DMRS described above in connection with FIG. 3. In order to use a DMRS for such purposes, however, the symbol in which the DMRS is transmitted may need to have similar signal properties as a symbol in which a data transmission is transmitted, otherwise the estimation of the nonlinear noise may be inaccurate. For example, in order to use a DMRS to estimate the nonlinear noise associated with the channel, the symbol in which the DMRS is located may need to have the same bandwidth, transmit power, and similar parameters that may otherwise affect the distribution of the signal in the time domain.

However, a DMRS may also be used by the receiver 410 for linear channel estimation purposes. And when used for linear channel estimation purposes, the DMRS may not need to have the same signal properties as a symbol carrying a data transmission. More particularly, for linear channel estimation, it may be beneficial to deboost (e.g., transmit using a lower transmit power) the symbol in which the DMRS is located with respect to the symbol in which the data transmission is located. Moreover, traditionally all DMRSs within a single slot are transmitted at the same transmit power level. Thus, using a DMRS for nonlinear channel estimation purposes associated with DPoD is limited. This is because either the DMRSs within a slot are transmitted at a power level less than the power level used to transmit a data transmission (e.g., the DMRSs are deboosted) for linear channel estimation purposes, in which case the nonlinear channel estimation model fails, or else the DMRSs within a slot are transmitted at a power level at least as great as the power level used to transmit a data transmission (e.g., the DMRSs are boosted) for nonlinear channel estimation purposes, in which case the linear channel estimation model fails. Accordingly, a relatively high power back-off level may need to be maintained in order to compensate for the limited model capabilities, resulting in decreased power efficiency, signal distortion, or service interruption.

Some techniques and apparatuses described herein enable boosting or deboosting additional DMRSs transmitted within a slot. For example, in some aspects, a DMRS and an additional DMRS are both transmitted within a single slot, but using different transmit power levels. For example, a transmit power associated with the DMRS may be different from a transmit power associated with the additional DMRS. More particularly, the transmit power associated with the additional DMRS may be deboosted with respect to the transmit power associated with the DMRS. In this way, the DMRS and the additional DMRS may beneficially be used for different channel estimation models. For example, the DMRS may be transmitted at a transmit power at least as great as a transmit power used to transmit a data transmission within the slot, and thus the DMRS may be used for purposes of nonlinear channel estimation. Moreover, the additional DMRS may be transmitted at a transmit power less than the transmit power used to transmit the data transmission within the slot, and thus the additional DMRS may be used for purposes of linear channel estimation. As a result of providing more than one DMRS in a slot, with at least two of the DMRSs transmitted at different transmit powers, the receiver 410 may employ more accurate channel estimation techniques (e.g., the receiver 410 may employ both linear and nonlinear channel estimation models), thereby enabling a reduced power back-off value, resulting in increased power efficiency, reduced signal distortion, and overall increased service.

As indicated above, FIG. 4 is provided as an example. Other examples may differ from what is described with respect to FIG. 4.

Figure 5:
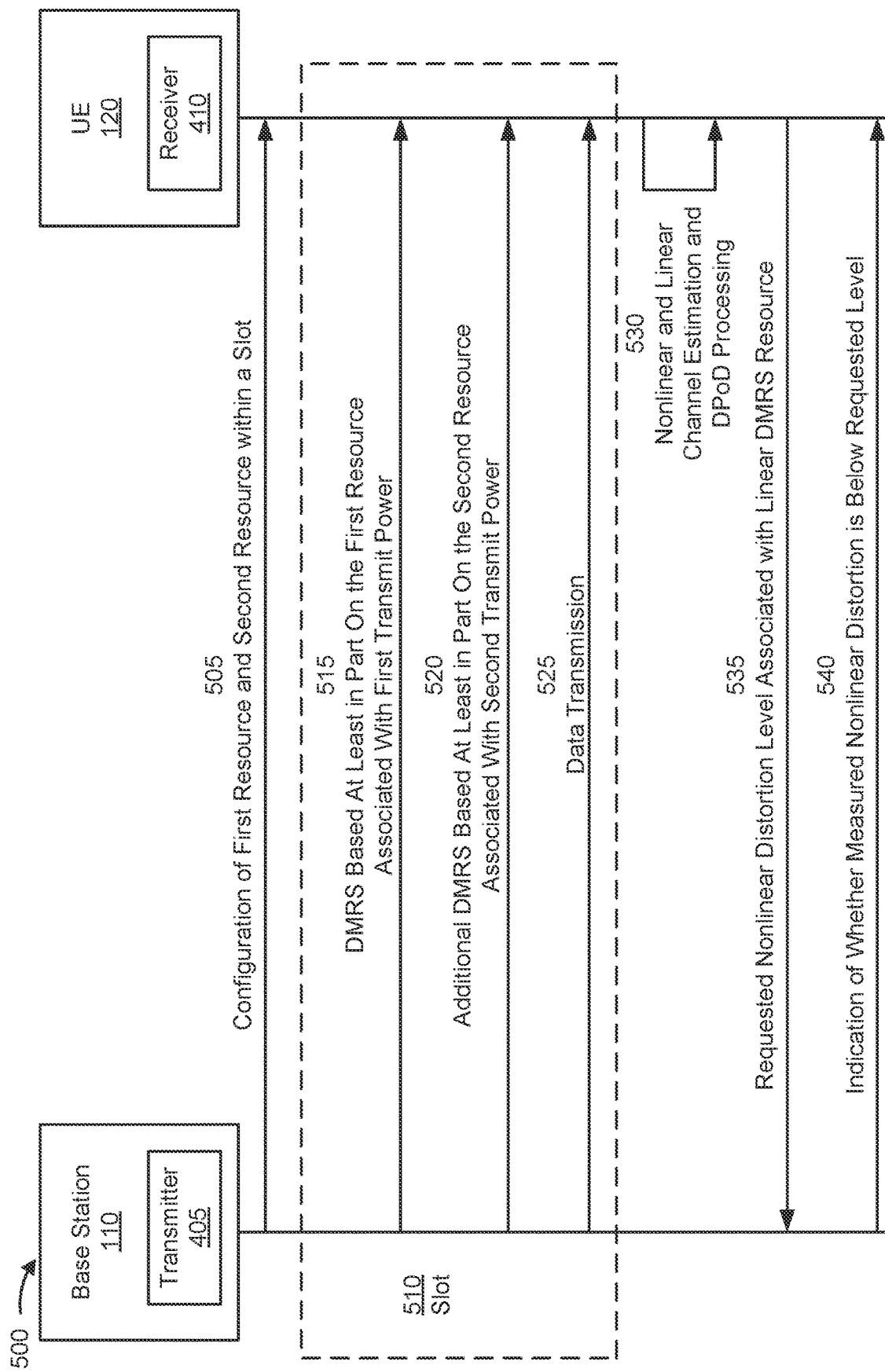
FIG. 5 is a diagram illustrating an example 500 associated with utilizing a demodulation reference signal (DMRS) for DPoD processing, in accordance with the present disclosure.

FIG. 5 is a diagram illustrating an example 500 associated with utilizing a DMRS for DPoD processing, in accordance with the present disclosure. As shown in FIG. 5, a base station 110 and a UE 120 may communicate with one another. In some aspects, one of the base station 110 or the UE 120 may include the transmitter 405 described in connection with FIG. 4, while the other of the base station 110 or the UE 120 may include the receiver 410 described in connection with FIG. 4. For ease of description, in the depicted example the base station 110 is shown as including the transmitter 405 and the UE 120 is shown as including the receiver 410, but in other aspects the UE 120 or another network device may include the transmitter 405 while the base station or another network device may include the receiver 410.

As shown by reference number 505, the base station 110 may transmit to the UE 120 a configuration of a first resource and a second resource within a slot 510. The slot 510 may include a contiguous number of symbols (e.g., fourteen) in the time domain and a contiguous number of resource elements (REs) in the frequency domain. The configuration of the first resource and the second resource may indicate, for each resource, time resources (e.g., symbols) and/or frequency resources (e.g., REs) within the slot 510 associated with a corresponding reference signal, such as one or more of the reference signals described above in connection with FIG. 3. In some aspects, the first resource and the second resource may be resources associated with a corresponding DMRS. In such aspects, at least two DMRSs may be received within the single slot 510, but aspects of the disclosure are not so limited. For example, in some other aspects, the configuration indicated by reference number 505 may indicate additional resources within the slot 510, such as a third resource associated with a third reference signal, a fourth resource associated with a fourth reference signal, and so forth, and thus additional DMRSs (e.g., a third DMRS, a fourth DMRS, and so on) may be received within the slot 510. In some aspects, the configuration transmitted to the UE 120 by the base station 110, as shown by reference number 505, may be provided via a DCI communication. In some other aspects, the configuration transmitted to the UE 120 by the base station 110, as shown by reference number 505, may be provided via a medium access control (MAC) control element (CE) communication.

As shown by reference numbers 515 and 520, the base station 110 may transmit, within the slot 510, a DMRS to the UE 120 based at least in part on the first resource, and an additional DMRS to the UE 120 based at least in part on the second resource. Moreover, the base station 110 may transmit the DMRS and the additional DMRS to the UE 120 using different respective transmit powers. Put another way, the base station 110 may power boost or power deboost the DMRS and the additional DMRS with respect to each other. For example, the base station 110 may transmit the DMRS using a first transmit power, and the base station 110 may transmit the additional DMRS using a second transmit power different from the first transmit power.

As shown by reference number 525, the base station 110 may also transmit a data transmission within the slot 510. In some aspects, the data transmission indicated by reference number 525 may be transmitted in a PDSCH or a similar channel. Moreover, the base station 110 may boost or deboost the transmit powers of the DMRS and/or the additional DMRS with respect to the transmit power of the data transmission indicated by reference number 525. For example, the base station 110 may transmit, in the slot 510 (e.g., within a PDSCH in the slot 510), the data transmission indicated by reference number 525 using a third transmit power level. In some aspects, the first transmit power is at least as great as the third transmit power (e.g., the DMRS is transmitted using the same or more transmit power as the data transmission indicated by reference number 525), while the second transmit power is less than the third transmit power (e.g., the additional DMRS is transmitted using the less transmit power than the data transmission indicated by reference number 525). In this regard, the DMRS and the additional DMRS may be utilized by the UE 120 for different channel estimation models, such as to estimate nonlinear noise and linear noise, respectively.

More particularly, as shown by reference number 530, the UE 120 may perform nonlinear and linear channel estimation using the DMRS and/or the additional DMRS. In some aspects, and as described above in connection with FIG. 4, a nonlinear channel estimation model may be best performed using a DMRS within the slot 510 that is transmitted using a transmit power at least as great as the transmit power used to transmit the data transmission indicated by reference number 525 within the slot 510. In that regard, in aspects in which the first transmit power (e.g., the transmit power associated with the DMRS) is at least as great as the third transmit power (e.g., the transmit power associated with the data transmission indicated by reference number 525), the UE 120 may use the DMRS for nonlinear channel estimation (e.g., to estimate the nonlinear noise in the channel). Moreover, in aspects in which the second transmit power (e.g., the transmit power associated with the additional DMRS) is less than the third transmit power (e.g., the transmit power associated with the data transmission indicated by reference number 525), the UE 120 may use the additional DMRS for linear channel estimation (e.g., to estimate the linear noise in the channel).

Moreover, as further indicated by reference number 530, in some aspects, the UE 120 may perform DPoD processing on one or more transmissions received from the base station 110, such as on the data transmission indicated by reference number 525 received in the slot 510. As described above in connection with FIG. 4, DPoD processing may require that the UE 120 estimate the nonlinear noise in the channel. Because, as described, the UE 120 may estimate the nonlinear noise using the DMRS (e.g., because the DMRS is transmitted using a transmit power at least as great as a transmit power used to transmit the data transmission indicated by reference number 525, the DMRS may be used for the nonlinear channel estimation model), the UE 120 may estimate the nonlinear noise based at least in part on the DMRS, and then perform the DPoD processing based at least in part on the estimated nonlinear noise. Moreover, because the additional DMRS is transmitted using a transmit power less than the transmit power used to transmit the DMRS and/or the data transmission indicated by reference number 525, power boosting the DMRS does not affect the ability of the UE 120 to perform linear channel estimation because the UE 120 may utilize the additional DMRS for such linear estimation purposes (e.g., because the additional DMRS is transmitted using a transmit power that is less than a transmit power used to transmit the data transmission indicated by reference number 525, the additional DMRS may be used for the linear channel estimation model).

In some aspects, one of the first resource or the second resource may be a linear-specific DMRS resource (sometimes referred to herein as a linear DMRS (LDMRS) resource). The LDMRS resource may be a resource within the slot 510 specifically configured for transmitting a DMRS associated with linear channel estimation. For example, in some aspects, the second resource (e.g., the resource associated with the additional DMRS) may be an LDMRS resource, and the additional DMRS may thus be specifically configured for use by the UE 120 for linear channel estimation. Again, this may be because, among other properties, the additional DMRS is deboosted (e.g., is transmitted at lower transmit power level) with respect to the data transmission indicated by reference number 525 transmitted in the slot 510. Moreover, in some aspects, the properties and configuration signaling for the LDMRS may be the same as the properties and configuration signaling for other DMRS resources within the slot 510 (e.g., the properties and configuration signaling for the linear-specific DMRS resource may be the same as the properties and configuration signaling for other DMRS resources within the slot 510).

In some aspects, the LDMRS resource may be associated with a nonlinear distortion level threshold such that the corresponding DMRS (e.g., the additional DMRS) may be used for linear channel estimation purposes. More particularly, in some aspects, the LDMRS may be associated with a configured and/or hard-coded nonlinear distortion level threshold. Additionally, or alternatively, as shown by reference number 535, in some aspects, the UE 120 may request a certain nonlinear distortion level associated with the LDMRS resource. More particularly, the UE 120 may be capable of handling various amounts of nonlinear distortion in the LDMRS, depending on certain factors, such as channel conditions, receiver 410 capabilities and requirements, or the like. Accordingly, the UE 120 may transmit the indication shown by reference number 535 indicating a requested nonlinear distortion level to the base station 110, which may vary from the configured and/or hard-coded nonlinear distortion level threshold. In some aspects, the UE 120 may provide the indication shown by reference number 535 via MAC CE signaling or the like.

As shown by reference number 540, the base station 110 may transmit an indication to the UE 120 indicating whether a nonlinear distortion level associated with the linear DMRS resource is below the requested nonlinear distortion level. For example, in some aspects, due to channel conditions, transmitter 405 capabilities and requirements, or the like, the base station 110 may or may not be able to meet the requested nonlinear distortion level, and thus may indicate whether the nonlinear distortion level is below the requested nonlinear distortion level, as indicated at reference number 540. The UE 120 may use the indication shown by reference number 540 when performing any linear channel estimations using a DMRS received via the LDMRS resource. In some aspects, the transmitter 405 may transmit the indication shown by reference number 540 via one of a DCI communication, a MAC CE communication, or a radio resource control (RRC) communication when operating in the downlink. In some other aspects, the transmitter 405 may transmit the indication shown by reference number 540 via one of a physical uplink control channel (PUCCH) or a MAC CE communication when operating in the uplink. Although for ease of description the indications shown by reference numbers 535 and 540 are shown as being exchanged after the nonlinear and linear channel estimation and/or DPoD processing, aspects of the disclosure are not so limited, and, in some other aspects, the indications shown by reference numbers 535 and 540 may be exchanged before the configuration of the first and second resources, as shown by reference number 505, and/or before the DMRS transmissions, as shown by reference numbers 515 and 520, or elsewhere in the transmission scheme shown in FIG. 5.

As indicated above, FIG. 5 is provided as an example. Other examples may differ from what is described with respect to FIG. 5.

Figure 6:
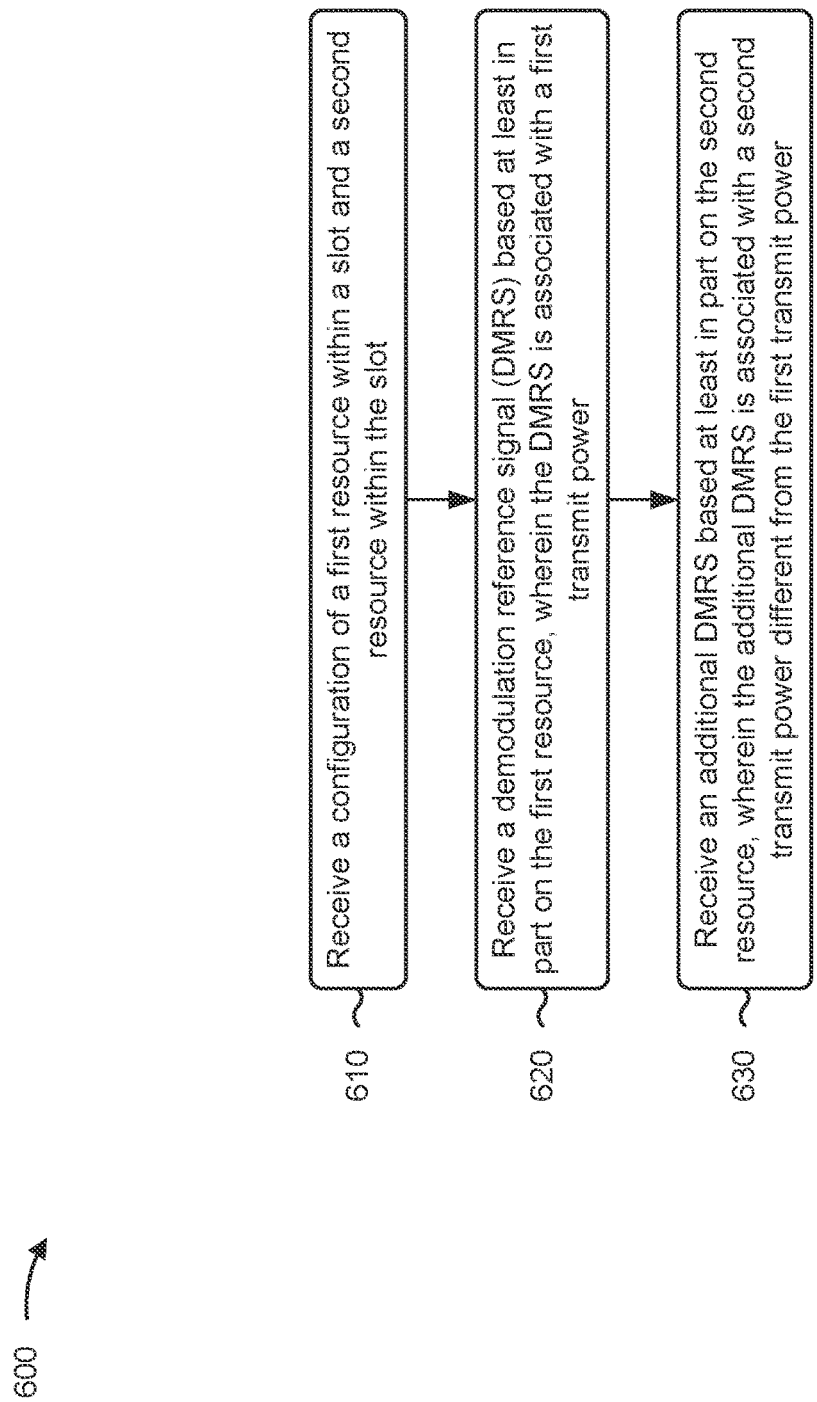
FIG. 6 is a diagram illustrating an example process performed, for example, by a UE, in accordance with the present disclosure.

FIG. 6 is a diagram illustrating an example process 600 performed, for example, by a UE, in accordance with the present disclosure. Example process 600 is an example where the UE (e.g., UE 120) performs operations associated with an LDMRS for DPoD processing.

As shown in FIG. 6, in some aspects, process 600 may include receiving a configuration of a first resource within a slot and a second resource within the slot (block 610). For example, the UE (e.g., using communication manager 140 and/or reception component 802, depicted in FIG. 8) may receive a configuration of a first resource within a slot and a second resource within the slot, as described above.

As further shown in FIG. 6, in some aspects, process 600 may include receiving a DMRS based at least in part on the first resource, wherein the DMRS is associated with a first transmit power (block 620). For example, the UE (e.g., using communication manager 140 and/or reception component 802, depicted in FIG. 8) may receive a DMRS based at least in part on the first resource, wherein the DMRS is associated with a first transmit power, as described above.

As further shown in FIG. 6, in some aspects, process 600 may include receiving an additional DMRS based at least in part on the second resource, wherein the additional DMRS is associated with a second transmit power different from the first transmit power (block 630). For example, the UE (e.g., using communication manager 140 and/or reception component 802, depicted in FIG. 8) may receive an additional DMRS based at least in part on the second resource, wherein the additional DMRS is associated with a second transmit power different from the first transmit power, as described above.

Process 600 may include additional aspects, such as any single aspect or any combination of aspects described below and/or in connection with one or more other processes described elsewhere herein.

In a first aspect, process 600 includes receiving a data transmission in the slot, wherein the data transmission is associated with a third transmit power, wherein the first transmit power is at least as great as the third transmit power, and wherein the second transmit power is less than the third transmit power.

In a second aspect, alone or in combination with the first aspect, process 600 includes performing a nonlinear channel estimation based at least in part on the DMRS, and performing a linear channel estimation based at least in part on the additional DMRS.

In a third aspect, alone or in combination with one or more of the first and second aspects, process 600 includes performing digital post distortion processing on the data transmission based at least in part on the nonlinear channel estimation.

In a fourth aspect, alone or in combination with one or more of the first through third aspects, the configuration is indicated by at least one of a DCI communication or a MAC CE communication.

In a fifth aspect, alone or in combination with one or more of the first through fourth aspects, the second resource is a linear DMRS resource.

In a sixth aspect, alone or in combination with one or more of the first through fifth aspects, the linear DMRS resource is associated with a nonlinear distortion level threshold.

In a seventh aspect, alone or in combination with one or more of the first through sixth aspects, process 600 includes transmitting, to a base station, an indication of a requested nonlinear distortion level associated with the linear DMRS resource.

In an eighth aspect, alone or in combination with one or more of the first through seventh aspects, process 600 includes receiving, from the base station, an indication of whether a measured nonlinear distortion level associated with the linear DMRS resource is below the requested nonlinear distortion level.

In a ninth aspect, alone or in combination with one or more of the first through eighth aspects, the indication of whether the measured nonlinear distortion level is below the requested nonlinear distortion level is received via one of a DCI communication, a MAC CE communication, or a RRC communication associated with a downlink communication, or one of a PUCCH communication or a MAC CE communication associated with an uplink communication.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
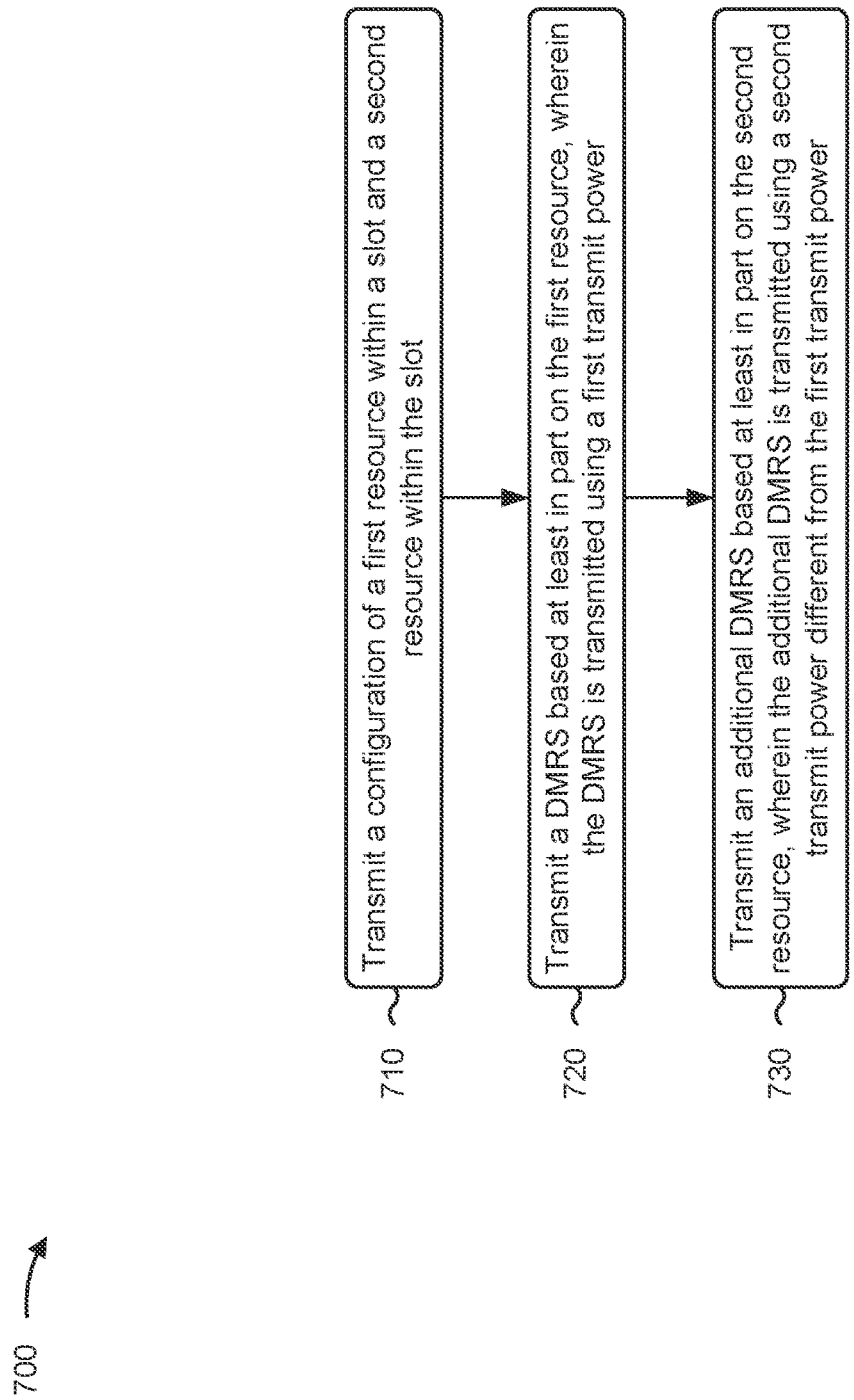
FIG. 7 is a diagram illustrating an example process performed, for example, by a base station, in accordance with the present disclosure.

FIG. 7 is a diagram illustrating an example process 700 performed, for example, by a network entity, in accordance with the present disclosure. Example process 700 is an example where the network entity (e.g., base station 110, a CU, a DU, an RU) performs operations associated with a LDMRS for DPoD processing.

As shown in FIG. 7, in some aspects, process 700 may include transmitting a configuration of a first resource within a slot and a second resource within the slot (block 710). For example, the network entity (e.g., using communication manager 150 and/or transmission component 904, depicted in FIG. 9) may transmit a configuration of a first resource within a slot and a second resource within the slot, as described above.

As further shown in FIG. 7, in some aspects, process 700 may include transmitting a DMRS based at least in part on the first resource, wherein the DMRS is transmitted using a first transmit power (block 720). For example, the network entity (e.g., using communication manager 150 and/or transmission component 904, depicted in FIG. 9) may transmit a DMRS based at least in part on the first resource, wherein the DMRS is transmitted using a first transmit power, as described above.

As further shown in FIG. 7, in some aspects, process 700 may include transmitting an additional DMRS based at least in part on the second resource, wherein the additional DMRS is transmitted using a second transmit power different from the first transmit power (block 730). For example, the network entity (e.g., using communication manager 150 and/or transmission component 904, depicted in FIG. 9) may transmit an additional DMRS based at least in part on the second resource, wherein the additional DMRS is transmitted using a second transmit power different from the first transmit power, as described above.

Process 700 may include additional aspects, such as any single aspect or any combination of aspects described below and/or in connection with one or more other processes described elsewhere herein.

In a first aspect, process 700 includes transmitting a data transmission in the slot, wherein the data transmission is transmitted using a third transmit power, wherein the first transmit power is at least as great as the third transmit power, and wherein the second transmit power is less than the third transmit power.

In a second aspect, alone or in combination with the first aspect, the configuration is indicated by at least one of a DCI communication or a MAC CE communication.

In a third aspect, alone or in combination with one or more of the first and second aspects, the second resource is a linear DMRS resource.

In a fourth aspect, alone or in combination with one or more of the first through third aspects, the linear DMRS resource is associated with a nonlinear distortion level threshold.

In a fifth aspect, alone or in combination with one or more of the first through fourth aspects, process 700 includes receiving an indication of a requested nonlinear distortion level associated with the linear DMRS resource.

In a sixth aspect, alone or in combination with one or more of the first through fifth aspects, process 700 includes transmitting an indication of whether a measured nonlinear distortion level associated with the linear DMRS resource is below the requested nonlinear distortion level.

In a seventh aspect, alone or in combination with one or more of the first through sixth aspects, the indication of whether the measured nonlinear distortion level is below the requested nonlinear distortion level is transmitted via one of a DCI communication, a MAC CE communication, or a RRC communication associated with a downlink communication, or one of a PUCCH communication or a MAC CE communication associated with an uplink communication.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
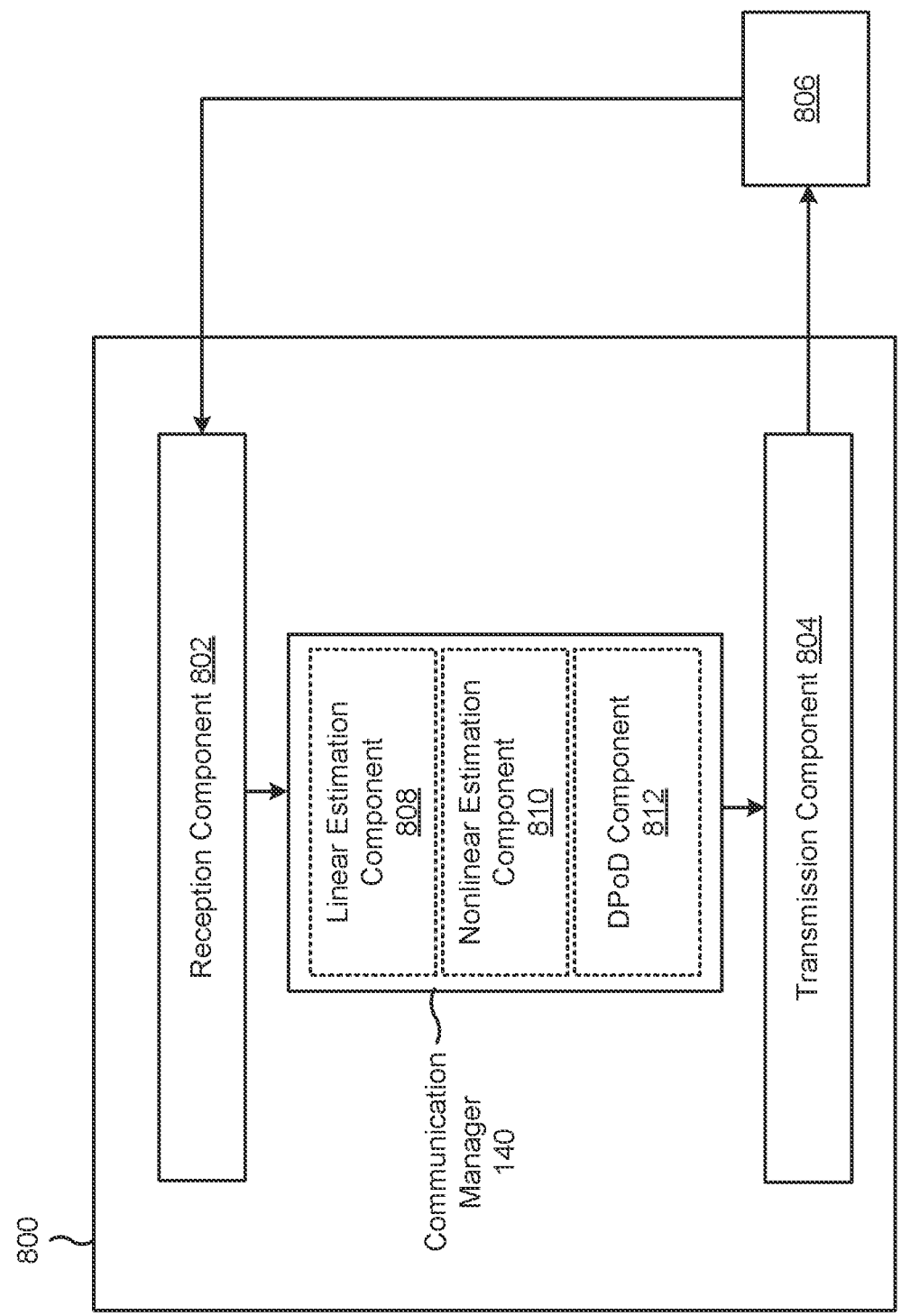
FIG. 8 is a diagram of an example apparatus for wireless communication, in accordance with the present disclosure.

FIG. 8 is a diagram of an example apparatus 800 for wireless communication, in accordance with the present disclosure. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include one or more of a linear estimation component 808, a nonlinear estimation component 810, or a DPoD component 812, among other examples.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The reception component 802 may receive a configuration of a first resource within a slot and a second resource within the slot. The reception component 802 may receive a DMRS based at least in part on the first resource, wherein the DMRS is associated with a first transmit power. The reception component 802 may receive an additional DMRS based at least in part on the second resource, wherein the additional DMRS is associated with a second transmit power different from the first transmit power.

The reception component 802 may receive a data transmission in the slot, wherein the data transmission is associated with a third transmit power, wherein the first transmit power is at least as great as the third transmit power, and wherein the second transmit power is less than the third transmit power.

The nonlinear estimation component 810 may perform a nonlinear channel estimation based at least in part on the DMRS.

The linear estimation component 808 may perform a linear channel estimation based at least in part on the additional DMRS.

The DPoD component 812 may perform digital post distortion processing on the data transmission based at least in part on the nonlinear channel estimation.

The transmission component 804 may transmit, to a base station, an indication of a requested nonlinear distortion level associated with the linear DMRS resource.

The reception component 802 may receive, from the base station, an indication of whether a measured nonlinear distortion level associated with the linear DMRS resource is below the requested nonlinear distortion level.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
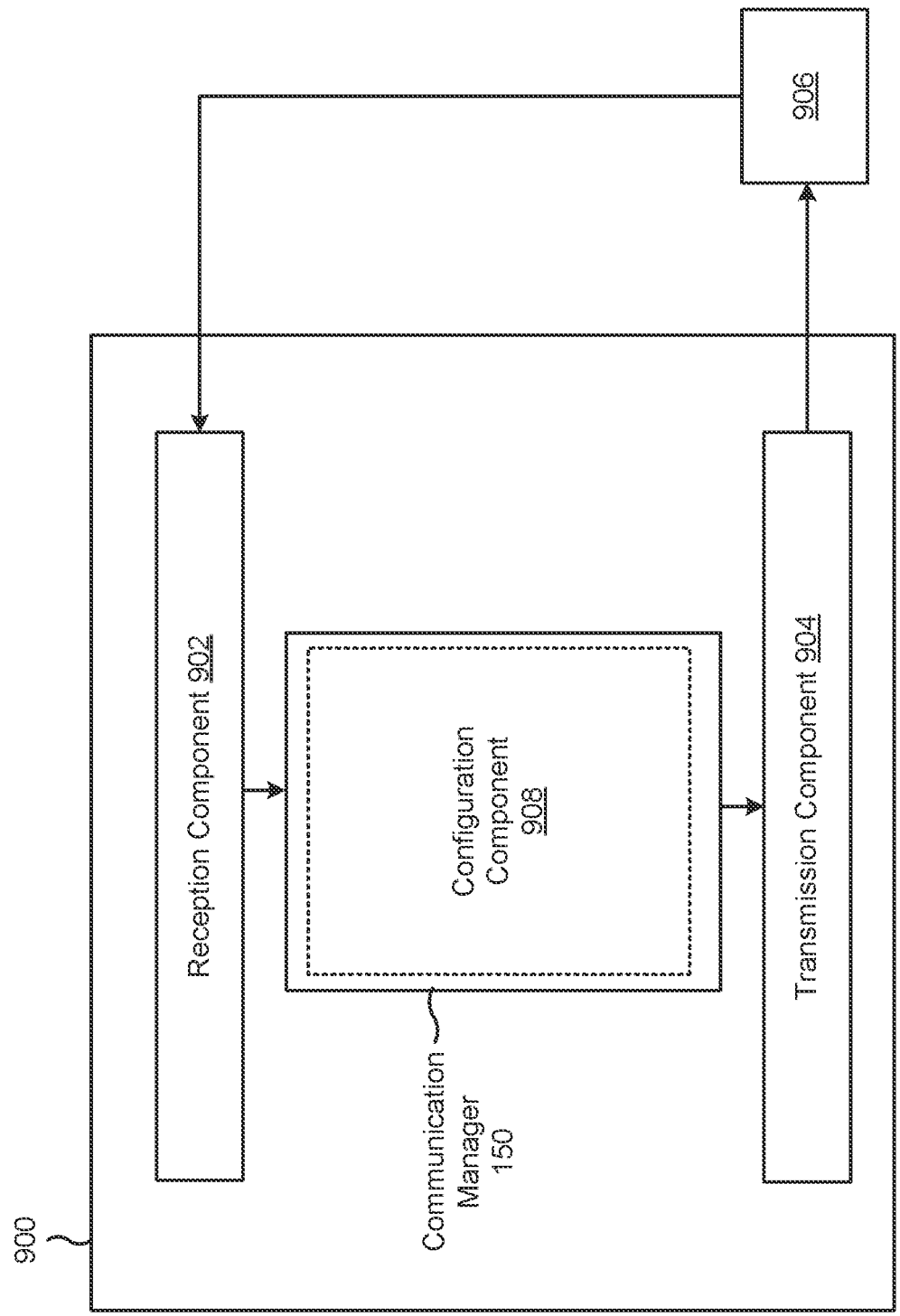
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 150. The communication manager 150 may include a configuration component 908, among other examples.

In some aspects, the apparatus 900 may be configured to perform one or more operations described herein in connection with FIG. 5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the base station described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the base station described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the base station described in connection with FIG. 2. In some aspects, the transmission component 904 may be co-located with the reception component 902 in a transceiver.

The transmission component 904 and/or the configuration component 908 may transmit a configuration of a first resource within a slot and a second resource within the slot. The transmission component 904 may transmit a DMRS based at least in part on the first resource, wherein the DMRS is transmitted using a first transmit power. The transmission component 904 may transmit an additional DMRS based at least in part on the second resource, wherein the additional DMRS is transmitted using a second transmit power different from the first transmit power.

The transmission component 904 may transmit a data transmission in the slot, wherein the data transmission is transmitted using a third transmit power, wherein the first transmit power is at least as great as the third transmit power, and wherein the second transmit power is less than the third transmit power.

The reception component 902 may receive, from a UE, an indication of a requested nonlinear distortion level associated with the linear DMRS resource.

The transmission component 904 may transmit, to the UE, an indication of whether a measured nonlinear distortion level associated with the linear DMRS resource is below the requested nonlinear distortion level.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a UE, comprising: receiving a configuration of a first resource within a slot and a second resource within the slot; receiving a DMRS based at least in part on the first resource, wherein the DMRS is associated with a first transmit power; and receiving an additional DMRS based at least in part on the second resource, wherein the additional DMRS is associated with a second transmit power different from the first transmit power.

Aspect 2: The method of Aspect 1, further comprising receiving a data transmission in the slot, wherein the data transmission is associated with a third transmit power, wherein the first transmit power is at least as great as the third transmit power, and wherein the second transmit power is less than the third transmit power.

Aspect 3: The method of Aspect 2, further comprising: performing a nonlinear channel estimation based at least in part on the DMRS; and performing a linear channel estimation based at least in part on the additional DMRS.

Aspect 4: The method of Aspect 3, further comprising performing digital post distortion processing on the data transmission based at least in part on the nonlinear channel estimation.

Aspect 5: The method of any of Aspects 1-4, wherein the configuration is indicated by at least one of a DCI communication or a MAC CE communication.

Aspect 6: The method of any of Aspects 1-5, wherein the second resource is a linear DMRS resource.

Aspect 7: The method of Aspect 6, wherein the linear DMRS resource is associated with a nonlinear distortion level threshold.

Aspect 8: The method of Aspect 6, further comprising transmitting, to a base station, an indication of a requested nonlinear distortion level associated with the linear DMRS resource.

Aspect 9: The method of Aspect 8, further comprising receiving, from the base station, an indication of whether a measured nonlinear distortion level associated with the linear DMRS resource is below the requested nonlinear distortion level.

Aspect 10: The method of Aspect 9, wherein the indication of whether the measured nonlinear distortion level is below the requested nonlinear distortion level is received via one of a DCI communication, a MAC CE communication, or a RRC communication associated with a downlink communication, or one of a PUCCH communication or a MAC CE communication associated with an uplink communication.

Aspect 11: A method of wireless communication performed by a network entity, comprising: transmitting a configuration of a first resource within a slot and a second resource within the slot; and transmitting a DMRS based at least in part on the first resource, wherein the DMRS is transmitted using a first transmit power; and transmitting an additional DMRS based at least in part on the second resource, wherein the additional DMRS is transmitted using a second transmit power different from the first transmit power.

Aspect 12: The method of Aspect 11, further comprising transmitting a data transmission in the slot, wherein the data transmission is transmitted using a third transmit power, wherein the first transmit power is at least as great as the third transmit power, and wherein the second transmit power is less than the third transmit power.

Aspect 13: The method of any of Aspects 11-12, wherein the configuration is indicated by at least one of a DCI communication or a MAC CE communication.

Aspect 14: The method of any of Aspects 11-13, wherein the second resource is a linear DMRS resource.

Aspect 15: The method of Aspect 14, wherein the linear DMRS resource is associated with a nonlinear distortion level threshold.

Aspect 16: The method of Aspect 14, further comprising receiving an indication of a requested nonlinear distortion level associated with the linear DMRS resource.

Aspect 17: The method of Aspect 16, further comprising transmitting an indication of whether a measured nonlinear distortion level associated with the linear DMRS resource is below the requested nonlinear distortion level.

Aspect 18: The method of Aspect 17, wherein the indication of whether the measured nonlinear distortion level is below the requested nonlinear distortion level is transmitted via one of a DCI communication, a MAC CE communication, or a RRC communication associated with a downlink communication, or one of a PUCCH communication or a MAC CE communication associated with an uplink communication.

Aspect 19: An apparatus for wireless communication at a device, comprising a processor; memory coupled with the processor; and instructions stored in the memory and executable by the processor to cause the apparatus to perform the method of one or more of Aspects 1-10.

Aspect 20: A device for wireless communication, comprising a memory and one or more processors coupled to the memory, the one or more processors configured to perform the method of one or more of Aspects 1-10.

Aspect 21: An apparatus for wireless communication, comprising at least one means for performing the method of one or more of Aspects 1-10.

Aspect 22: A non-transitory computer-readable medium storing code for wireless communication, the code comprising instructions executable by a processor to perform the method of one or more of Aspects 1-10.

Aspect 23: A non-transitory computer-readable medium storing a set of instructions for wireless communication, the set of instructions comprising one or more instructions that, when executed by one or more processors of a device, cause the device to perform the method of one or more of Aspects 1-10.

Aspect 24: An apparatus for wireless communication at a device, comprising a processor; memory coupled with the processor; and instructions stored in the memory and executable by the processor to cause the apparatus to perform the method of one or more of Aspects 11-18.

Aspect 25: A device for wireless communication, comprising a memory and one or more processors coupled to the memory, the one or more processors configured to perform the method of one or more of Aspects 11-18.

Aspect 26: An apparatus for wireless communication, comprising at least one means for performing the method of one or more of Aspects 11-18.

Aspect 27: A non-transitory computer-readable medium storing code for wireless communication, the code comprising instructions executable by a processor to perform the method of one or more of Aspects 11-18.

Aspect 28: A non-transitory computer-readable medium storing a set of instructions for wireless communication, the set of instructions comprising one or more instructions that, when executed by one or more processors of a device, cause the device to perform the method of one or more of Aspects 11-18.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   a memory; and
   one or more processors, coupled to the memory, configured to:
   receive a configuration of a first resource within a slot and a second resource within the slot;
   receive a demodulation reference signal (DMRS) based at least in part on the first resource, wherein the DMRS is associated with a first transmit power; and
   receive an additional DMRS based at least in part on the second resource, wherein the additional DMRS is associated with a second transmit power different from the first transmit power.

2. The apparatus of claim 1, wherein the one or more processors are further configured to receive a data transmission in the slot, wherein the data transmission is associated with a third transmit power, wherein the first transmit power is at least as great as the third transmit power, and wherein the second transmit power is less than the third transmit power.

3. The apparatus of claim 2, wherein the one or more processors are further configured to:
perform a nonlinear channel estimation based at least in part on the DMRS; and
perform a linear channel estimation based at least in part on the additional DMRS.

4. The apparatus of claim 3, wherein the one or more processors are further configured to perform digital post distortion processing on the data transmission based at least in part on the nonlinear channel estimation.

5. The apparatus of claim 1, wherein the configuration is indicated by at least one of a downlink control information (DCI) communication or a medium access control (MAC) control element (CE) communication.

6. The apparatus of claim 1, wherein the second resource is a linear DMRS resource.

7. The apparatus of claim 6, wherein the linear DMRS resource is associated with a nonlinear distortion level threshold.

8. The apparatus of claim 6, wherein the one or more processors are further configured to transmit, to a base station, an indication of a requested nonlinear distortion level associated with the linear DMRS resource.

9. The apparatus of claim 8, wherein the one or more processors are further configured to receive, from the base station, an indication of whether a measured nonlinear distortion level associated with the linear DMRS resource is below the requested nonlinear distortion level.

10. The apparatus of claim 9, wherein the indication of whether the measured nonlinear distortion level is below the requested nonlinear distortion level is received via:
one of a downlink control information (DCI) communication, a medium access control (MAC) control element (CE) communication, or a radio resource control (RRC) communication associated with a downlink communication, or
one of a physical uplink control channel (PUCCH) communication or a MAC CE communication associated with an uplink communication.

11. An apparatus for wireless communication at a network entity, comprising:
a memory; and
one or more processors, coupled to the memory, configured to:
transmit a configuration of a first resource within a slot and a second resource within the slot; and
transmit a demodulation reference signal (DMRS) based at least in part on the first resource, wherein the DMRS is transmitted using a first transmit power; and
transmit an additional DMRS based at least in part on the second resource, wherein the additional DMRS is transmitted using a second transmit power different from the first transmit power.

12. The apparatus of claim 11, wherein the one or more processors are further configured to transmit a data transmission in the slot, wherein the data transmission is transmitted using a third transmit power, wherein the first transmit power is at least as great as the third transmit power, and wherein the second transmit power is less than the third transmit power.

13. The apparatus of claim 11, wherein the configuration is indicated by at least one of a downlink control information (DCI) communication or a medium access control (MAC) control element (CE) communication.

14. The apparatus of claim 11, wherein the second resource is a linear DMRS resource.

15. The apparatus of claim 14, wherein the linear DMRS resource is associated with a nonlinear distortion level threshold.

16. The apparatus of claim 14, wherein the one or more processors are further configured to receive an indication of a requested nonlinear distortion level associated with the linear DMRS resource.

17. The apparatus of claim 16, wherein the one or more processors are further configured to transmit an indication of whether a measured nonlinear distortion level associated with the linear DMRS resource is below the requested nonlinear distortion level.

18. The apparatus of claim 17, wherein the indication of whether the measured nonlinear distortion level is below the requested nonlinear distortion level is transmitted via:
one of a downlink control information (DCI) communication, a medium access control (MAC) control element (CE) communication, or a radio resource control (RRC) communication associated with a downlink communication, or
one of a physical uplink control channel (PUCCH) communication or a MAC CE communication associated with an uplink communication.

19. A method of wireless communication performed by a user equipment (UE), comprising:
receiving a configuration of a first resource within a slot and a second resource within the slot;
receiving a demodulation reference signal (DMRS) based at least in part on the first resource, wherein the DMRS is associated with a first transmit power; and
receiving an additional DMRS based at least in part on the second resource, wherein the additional DMRS is associated with a second transmit power different from the first transmit power.

20. The method of claim 19, further comprising receiving a data transmission in the slot, wherein the data transmission is associated with a third transmit power, wherein the first transmit power is at least as great as the third transmit power, and wherein the second transmit power is less than the third transmit power.

21. The method of claim 20, further comprising:
performing a nonlinear channel estimation based at least in part on the DMRS; and
performing a linear channel estimation based at least in part on the additional DMRS.

22. The method of claim 21, further comprising performing digital post distortion processing on the data transmission based at least in part on the nonlinear channel estimation.

23. The method of claim 19, wherein the second resource is a linear DMRS resource.

24. The method of claim 23, wherein the linear DMRS resource is associated with a nonlinear distortion level threshold.

25. The method of claim 23, further comprising transmitting, to a network entity, an indication of a requested nonlinear distortion level associated with the linear DMRS resource.

26. The method of claim 25, further comprising receiving, from the network entity, an indication of whether a measured nonlinear distortion level associated with the linear DMRS resource is below the requested nonlinear distortion level.

27. A method of wireless communication performed by a network entity, comprising:
- transmitting a configuration of a first resource within a slot and a second resource within the slot; and
- transmitting a demodulation reference signal (DMRS) based at least in part on the first resource, wherein the DMRS is transmitted using a first transmit power; and
- transmitting an additional DMRS based at least in part on the second resource, wherein the additional DMRS is transmitted using a second transmit power different from the first transmit power.

28. The method of claim 27, further comprising transmitting a data transmission in the slot, wherein the data transmission is transmitted using a third transmit power, wherein the first transmit power is at least as great as the third transmit power, and wherein the second transmit power is less than the third transmit power.

29. The method of claim 27, wherein the second resource is a linear DMRS resource.

30. The method of claim 29, wherein the linear DMRS resource is associated with a nonlinear distortion level threshold.

* * * * *